US012305608B2

(12) United States Patent
Miller

(10) Patent No.: US 12,305,608 B2
(45) Date of Patent: May 20, 2025

(54) BUOYANCY ENGINE

(71) Applicant: Synchrogen Energy Pty Ltd, Wilson (AU)

(72) Inventor: Nathan Morris Miller, Wilson (AU)

(73) Assignee: Synchrogen Energy Pty Ltd, Wilson (AU)

( * ) Notice: Subject to any disclaimer, the term of this patent is extended or adjusted under 35 U.S.C. 154(b) by 0 days.

(21) Appl. No.: 18/689,753

(22) PCT Filed: Sep. 6, 2022

(86) PCT No.: PCT/AU2022/051082
§ 371 (c)(1),
(2) Date: Mar. 6, 2024

(87) PCT Pub. No.: WO2023/035028
PCT Pub. Date: Mar. 16, 2023

(65) Prior Publication Data

US 2024/0392741 A1 Nov. 28, 2024

(30) Foreign Application Priority Data

Sep. 8, 2021 (AU) ................................ 2021902900

(51) Int. Cl.
*F03B 17/02* (2006.01)
*F03B 11/00* (2006.01)

(52) U.S. Cl.
CPC .......... *F03B 17/025* (2013.01); *F03B 11/002* (2013.01); *F03B 17/02* (2013.01); *F05B 2210/18* (2013.01); *F05B 2270/506* (2013.01)

(58) Field of Classification Search
CPC ........ F03B 17/02; F03B 17/025; F03B 17/04; F03B 11/002; F05B 2210/18; F05B 2270/506
See application file for complete search history.

(56) References Cited

U.S. PATENT DOCUMENTS 4,083,186 A * 4/1978 Jackson, Sr. .......... F03B 13/187 60/486
8,360,205 B1 1/2013 Munoz
(Continued)

FOREIGN PATENT DOCUMENTS

FR 2991732 A1 12/2013
GB 507093 A 6/1939
(Continued)

OTHER PUBLICATIONS

"International Search Report"; prepared for application No. PCT/AU2022/051082; authorized officer Arun Sharma; Nov. 18, 2022; 5 pages.

*Primary Examiner* — Loren C Edwards
(74) *Attorney, Agent, or Firm* — Winstead PC

(57) ABSTRACT

Provided is a buoyancy engine (10) comprising a support frame (12) and at least two pairs of reciprocating arrangements (14) supported on said support frame (12). Each reciprocating arrangement (14) comprises i) a fluid cylinder (16) operatively filled with a fluid, such as water; ii) a float (20) arranged within the fluid cylinder (16) and defining a reservoir (22) with an exhaust valve (24) located at an upper portion and a charging aperture (26) at a lower portion via which said float (20) is chargeable with air; iii) an air injection assembly (28) comprising a pump (30) and an injection conduit (32), the pump (30) linked to the float (20) so that said pump (30) draws atmospheric air when the float (20) descends and charges said air via the injection conduit (32) when the float (20) ascends; iv) a force multiplier assembly (38) supported on the frame (12) and configured to apply mechanical advantage between the float (20) and the pump (30); and v) a power take-off (40) linked to the float (20) and configured to transfer energy from the float (20) as said float (20) ascends within the cylinder (16). Engine (10) further includes a flywheel (42) arranged on the support
(Continued)

frame (12) and coupled to the respective power-take offs (40). In this manner, each pair of reciprocating arrangements 14.1 and 14.2 are opposedly arranged with their floats (20) linked in a reciprocating manner, wherein each air injection assembly (28) is arranged to inject air into the float (20), via the charging aperture (26), of an adjacent reciprocating arrangement (14) of the other pair, to facilitate continuous actuation of the flywheel (42) as the engine (10) operates.

20 Claims, 4 Drawing Sheets

(56) References Cited

U.S. PATENT DOCUMENTS 10,415,541 B1 * 9/2019 Lorusso ................ F03B 17/025
2008/0264056 A1 10/2008 Tung

FOREIGN PATENT DOCUMENTS

WO 2019028492 A1 2/2019
WO WO-2019088960 A1 * 5/2019
WO 2019220457 A1 11/2019

* cited by examiner

BUOYANCY ENGINE

TECHNICAL FIELD

This invention broadly relates to the fields of buoyancy and mechanical energy conversion, and more particularly to a buoyancy engine.

BACKGROUND ART

The following discussion of the background art is intended to facilitate an understanding of the present invention only. The discussion is not an acknowledgement or admission that any of the material referred to is or was part of the common general knowledge as at the priority date of the application.

A buoyancy engine broadly refers to a device that makes use of buoyancy changes or differences in order to provide a useful output, such as motion and/or displacement that can perform a specific or desired outcome.

Applicant has identified a need for a buoyancy engine able to provide such a useful output and/or energy conversion using, in one embodiment, readily-available atmospheric air and water.

The present invention was conceived with this goal in mind.

SUMMARY OF THE INVENTION

According to an aspect of the invention there is provided a buoyancy engine comprising:

- a support frame;
- at least two pairs of reciprocating arrangements supported on said support frame, each reciprocating arrangement comprising:
  - i) a fluid cylinder operatively filled with a fluid, such as water;
  - ii) a float arranged within the fluid cylinder and defining a reservoir with an exhaust valve located at an upper portion and a charging aperture at a lower portion via which said float is chargeable with air;
  - iii) an air injection assembly comprising a pump and an injection conduit, the pump linked to the float so that said pump draws atmospheric air when the float descends and charges said air via the injection conduit when the float ascends;
  - iv) a force multiplier assembly supported on the frame and configured to apply mechanical advantage between the float and the pump; and
  - v) a power take-off linked to the float and configured to transfer energy from the float as said float ascends within the cylinder;
- a flywheel arranged on the support frame and coupled to the respective power-take offs;
- wherein each pair of reciprocating arrangements are opposedly arranged with their floats linked in a reciprocating manner; and
- wherein each air injection assembly is arranged to inject air into the float, via the charging aperture, of an adjacent reciprocating arrangement of the other pair, to facilitate continuous actuation of the flywheel as the engine operates.

The skilled addressee is to appreciate that, while water and atmospheric air are described, the present invention is not limited to such fluids and variations hereon are possible and expected, other fluids, i.e. liquids and/or gasses, are apposite.

In an embodiment, the support frame is substantially rectangular with a reciprocating arrangement arranged on each corner.

In an embodiment, the paired reciprocating arrangements are opposedly arranged with their floats linked in a reciprocating manner so that as a float of one reciprocating arrangement ascends, the other float of the other reciprocating arrangement of said pair descends.

Typically, each air injection assembly of a reciprocating arrangement is arranged to inject air into the float of an adjacent non-paired reciprocating arrangement.

In an embodiment, the exhaust valve of a float is configured to vent air automatically from the float when said float is at a climax, i.e. highest point of travel within the cylinder.

In an embodiment, the exhaust valve of a float is configured to close automatically when said float is at a nadir, i.e. lowest point of travel within the cylinder.

In an embodiment, the engine comprises an electronic controller configured to control the exhaust valve in order to regulate buoyancy of the float.

In an embodiment, each air injection assembly is configured to charge an adjacent float with air when said float is at a nadir, i.e. lowest point of travel within a cylinder.

In an embodiment, the charging aperture of a float includes an airlock valve which is configured to allow charging with air when said float is at a nadir and to seal once said float ascends.

In an embodiment, the pump of an air injection assembly comprises a bellows.

In an embodiment, the injection conduit includes an injection nozzle which is configured to protrude via the charging aperture of a float to charge air into the float reservoir when said float is at a nadir.

In an embodiment, the injection conduit is configured to define decreasing diameter from the pump to the injection nozzle.

In an embodiment, the injection conduit includes a controllable check valve proximate the injection nozzle.

In an embodiment, the engine comprises an electronic controller configured to control the airlock and controllable check valves in order to regulate charging of floats.

In an embodiment, the force multiplier assembly comprises a block and tackle system for applying a mechanical advantage between the float and pump.

In an embodiment, the block and tackle system is configured at a 3:1 mechanical advantage ratio.

Typically, the force multiplier assembly is configured to apply mechanical advantage when the float ascends and descends.

In an embodiment, the power take-off is regulated to provide a constant torque and/or velocity.

In an embodiment, the power take-off is regulated by means of variable speed gearing.

In an embodiment, the power take-off comprises a second force multiplier assembly linked to a drive wheel configured to actuate the flywheel via such variable speed gearing.

In an embodiment, the electronic controller is configured to control the variable speed gearing to achieve a desired constant torque and/or velocity to the flywheel.

In an embodiment, the engine includes a synchronous generator coupled to the flywheel to generate electrical energy.

In an embodiment, the reciprocating arrangement includes an exhaust hood configured to capture air vented from the float.

In an embodiment, the exhaust hood directs captured air to a turbine.

In an embodiment, each pair of reciprocating arrangements are opposedly arranged with their floats linked in a reciprocating manner by means of a cable and pulley arrangement.

According to a further aspect of the invention there is provided a buoyancy engine substantially as herein described and/or illustrated.

BRIEF DESCRIPTION OF THE DRAWINGS

The description will be made with reference to the accompanying drawings in which.

DETAILED DESCRIPTION OF EMBODIMENTS

Figure 1:
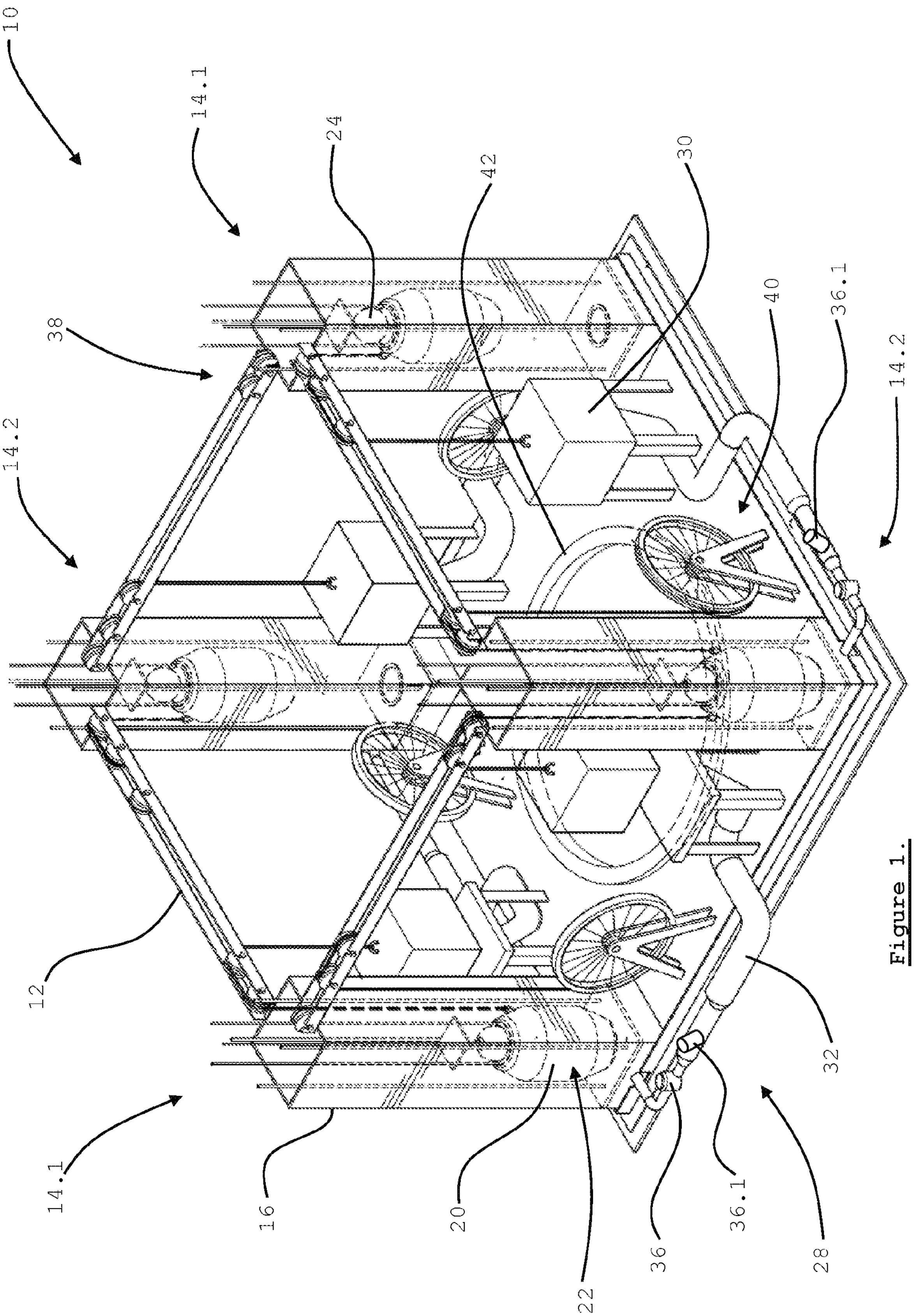
FIG. 1 a perspective-view is diagrammatic representation of one embodiment of a buoyancy engine, in accordance with aspects of the present invention.
Figure 2:
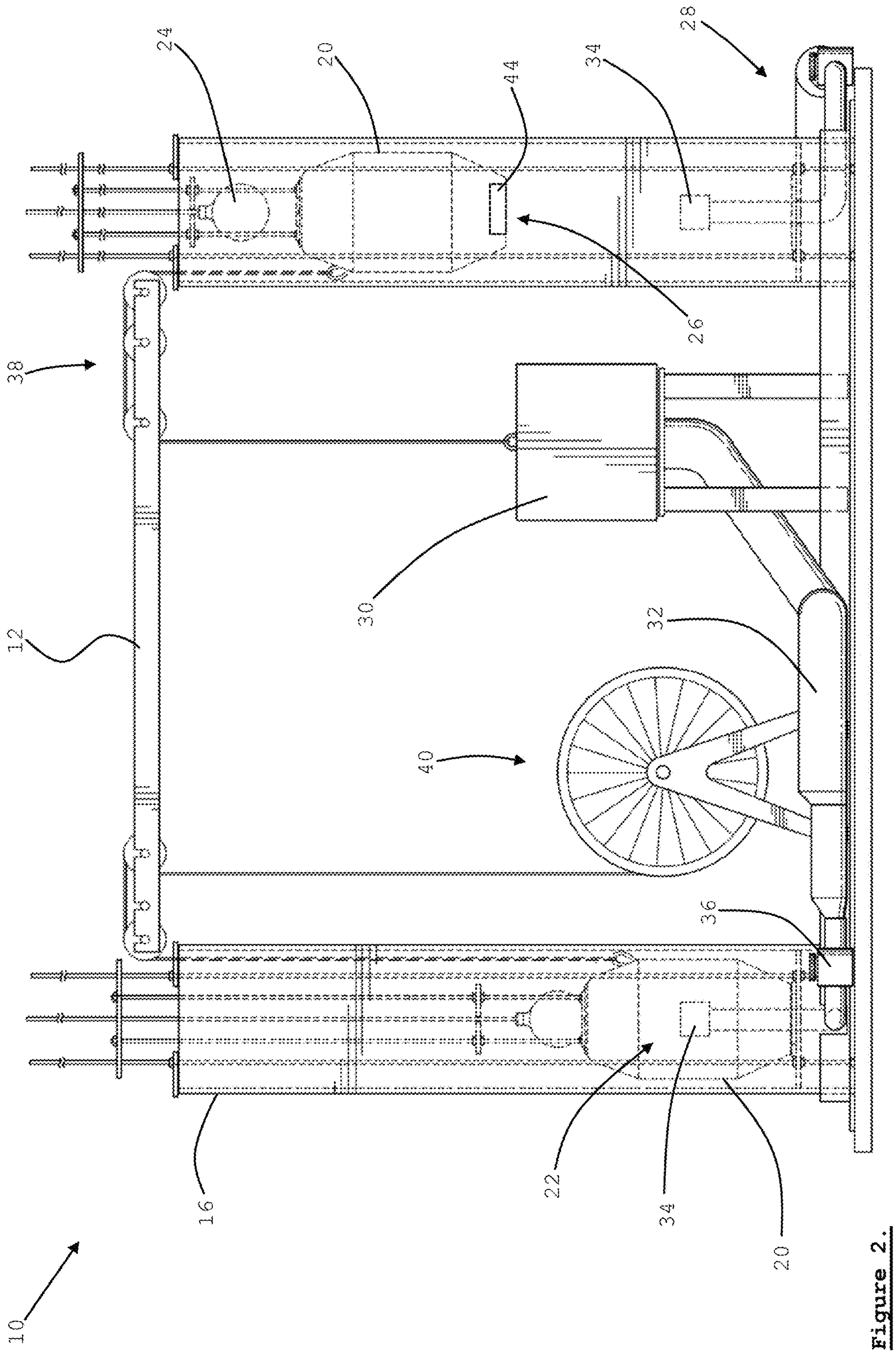
FIG. 2 is a diagrammatic side-view representation of aspects of the buoyancy engine of FIG. 1, particularly two non-paired reciprocating arrangements and a side-view of an example air injection assembly.

Further features of the present invention are more fully described in the following description of a non-limiting embodiment thereof. This description is included solely for the purposes of exemplifying the present invention to the skilled addressee. It should not be understood as a restriction on the broad summary, disclosure or description of the invention as set out above.

In the figures, incorporated to illustrate features of the example embodiment or embodiments, like reference numerals are used to identify like parts throughout. Additionally, features, mechanisms and aspects well-known and understood in the art will not be described in detail, as such features, mechanisms and aspects will within the understanding of the skilled addressee.

Additionally, the accompanying figures do not represent engineering or design drawings, but provide a functional overview of the invention only. As a result, features and practical construction details required for various embodiments may not be indicated in each figure, but such construction will be within the requirements understanding of the skilled addressee.

With reference now to the accompanying figures, there is broadly shown one embodiment of a buoyancy engine 10. Such an engine 10 generally makes use of buoyancy differences between fluids in order to actuate a flywheel 42 or similar rotational or translational mechanism, as described in more detail below, in order to extract a useful output or result.

The skilled addressee will appreciate that, while water and atmospheric air are described in reference to fluids used with such buoyancy differences, the present invention is not limited to such fluids and variations hereon are possible and expected, other fluids, i.e. liquids and/or gasses, are apposite.

In particular, a specific engine cycle or operational details are broadly provided herein and the skilled addressee is to appreciate that such an engine cycle may be realised in a number of different ways, the example provided herein intended to provide but one possible embodiment of such an engine and associated engine cycle.

For example, the embodiment exemplified in the figures illustrates two pairs, i.e. four, reciprocating arrangements 14. However, other embodiments may include a different number of such reciprocating arrangements 14, or the like. In addition, linkages between the various components are generally described via cables and pulleys, but variations hereon are possible and within the scope of the present invention.

Broadly, the buoyancy engine 10 comprises a support frame 12 used to support at least two pairs of reciprocating arrangements 14, and a flywheel 42 or similar energy extraction arrangement. The positioning and location of the respective components are arbitrary and provide but one possible outlay of such components.

In the embodiment shown, the support frame 12 is substantially rectangular with a reciprocating arrangement 14 arranged on each corner. The reciprocating arrangements are generally cross-paired, with one pair indicated via reference numeral 14.1 and the other pair via reference numeral 14.2.

Each reciprocating arrangement 14 generally comprises a fluid cylinder 16, a float 20, an air injection assembly 28, a force multiplier assembly 38, and a power take-off 40 which is linked to the flywheel 42.

Each fluid cylinder 16 is operatively filled with a fluid, such as water. A float 20 is arranged within each fluid cylinder 16 and defines a reservoir 22 having an exhaust valve 24 located at an upper portion, as shown, and a charging aperture 26 at a lower portion thereof. The charging aperture 26 provides a means via which said float 20 is chargeable with air, as described in more detail below. Buoyancy differences between the water in the cylinder 16 and the air in the float 20 provide forces that are synergistically exploited via the engine cycle described herein in order to drive the engine 10. Accordingly, float 20 is linked with other components as described below, but is able to ascend or descend within cylinder 16 depending on buoyancy and such links with other parts.

Figure 3:
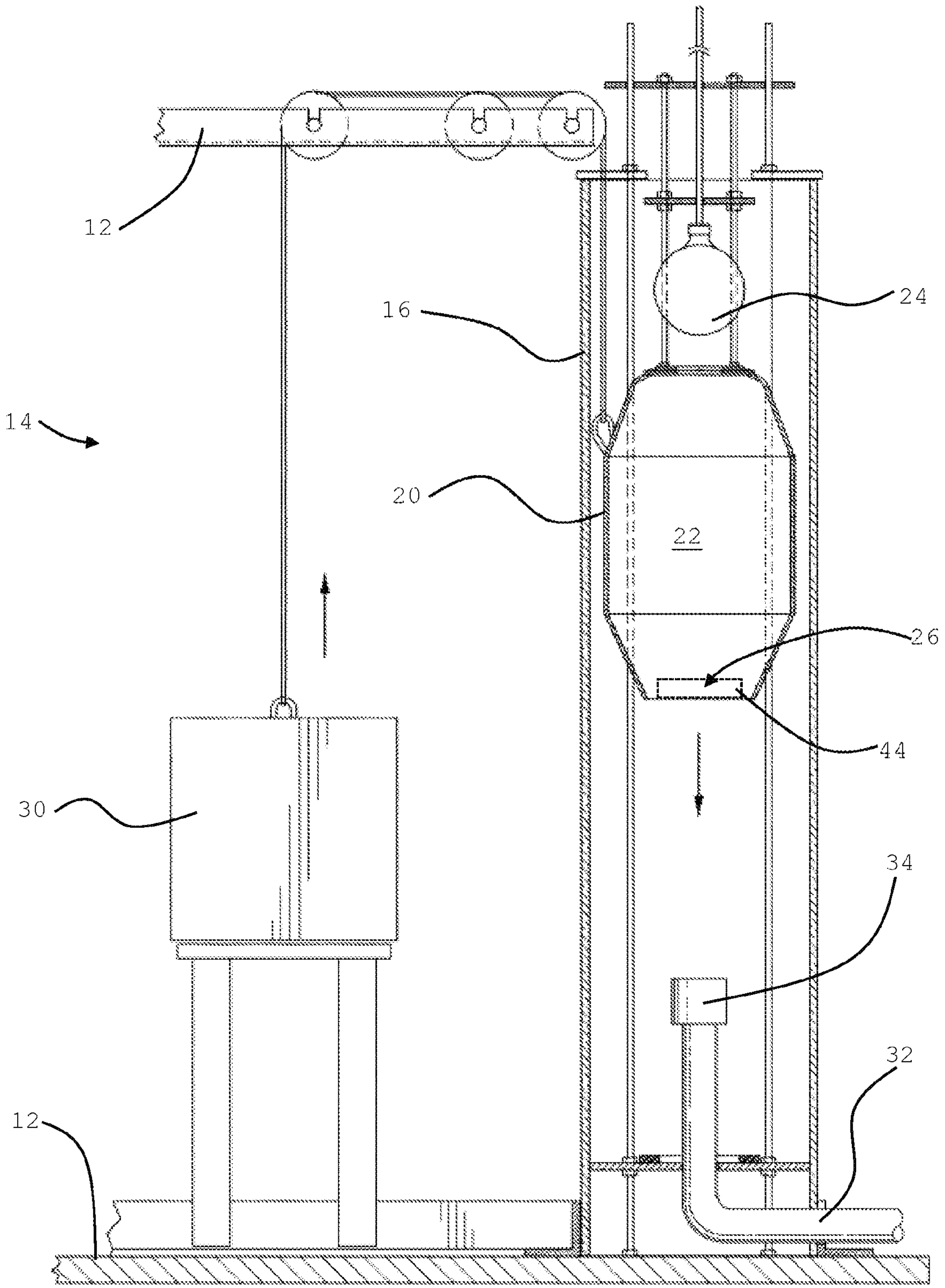
FIG. 3 is diagrammatic representation of the operation of a reciprocating arrangement with a float at a climax.
Figure 4:
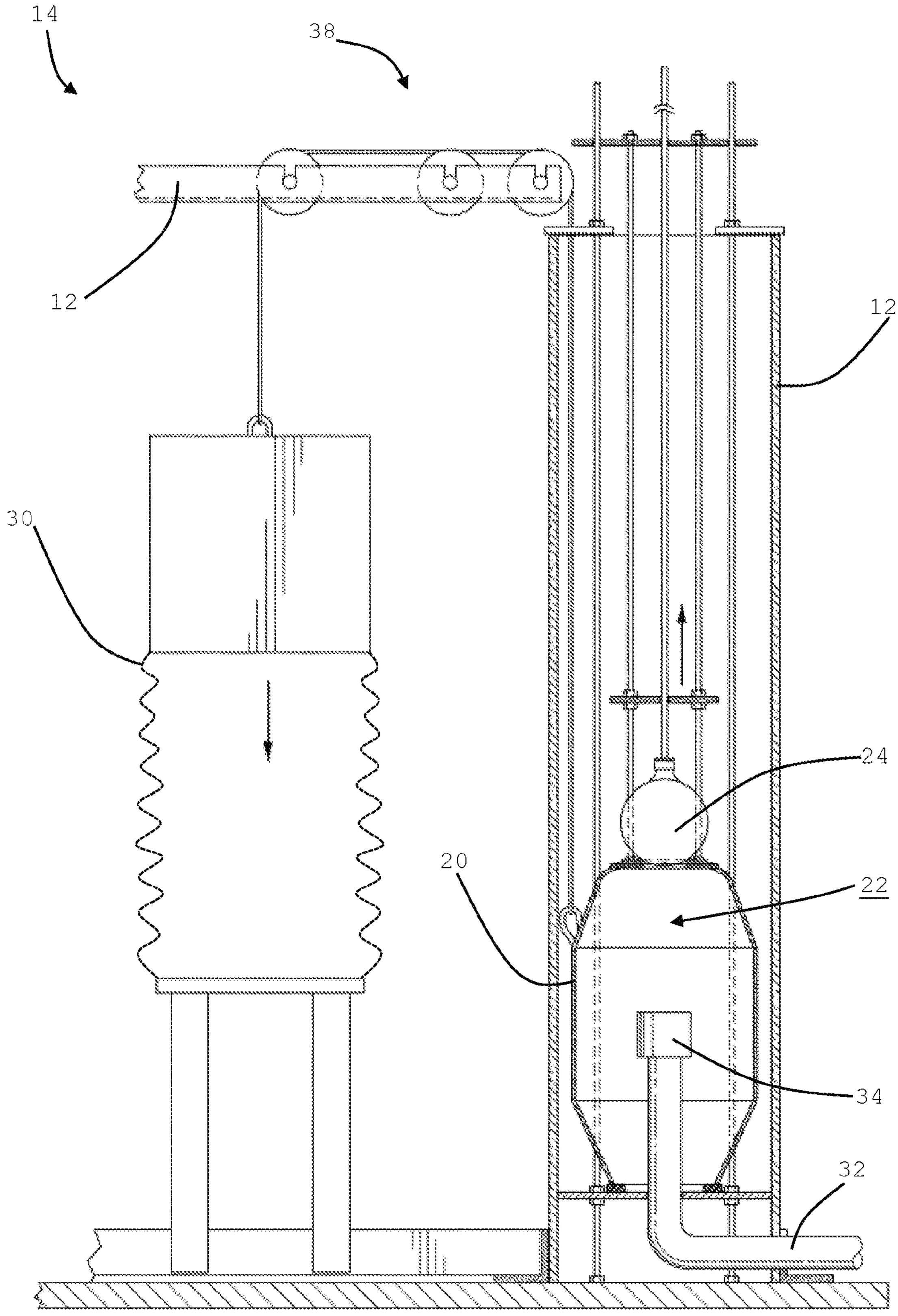
FIG. 4 is a diagrammatic representation of the operation of the reciprocating arrangement of FIG. 3 with the float at a nadir.

The exhaust valve 24 of a float 20 is generally configured to vent air automatically from the float 20 when the float 20 is at a climax, i.e. at a highest point of travel within the cylinder 16. An example hereof is diagrammatically indicated in FIG. 3. Similarly, the exhaust valve 24 of a float is generally configured to close automatically when said float 20 is at a nadir, i.e. at a lowest point of travel within the cylinder 16. Such a diagrammatic example is shown in FIG. 4. In an embodiment, the engine 10 comprises an electronic controller (not shown) configured to control the exhaust valve 24 in order to regulate air buoyancy of the float 20, as described.

The air injection assembly 28 of each reciprocating arrangement 14 generally comprises a pump 30 and an injection conduit 32. In an embodiment, the pump 30 comprises a bellows-type pump. Importantly, the pump 30 is linked to the float 20 of the same reciprocating arrangement 14 so that the pump 30 draws atmospheric air via a suitable inlet when the float 20 descends and charges said air via the injection conduit when the float 20 ascends. Such a link between float 20 and pump 30 is generally done via force multiplier assembly 38 at either end of the float 20, described in more detail below.

Importantly, each air: injection assembly 28 is configured to charge an adjacent float 20 with air when said float 20 is at a nadir, i.e. the float of an adjacent, non-paired reciprocating arrangement 14. For example, reciprocating arrangement will 14.1 charge air into reciprocating arrangement 14.2 next to it. Such sequential 'rotation' of air charging around the reciprocating arrangements 14 on the frame 12 may be clockwise or counter clockwise, depending on configuration of the engine 10.

The injection conduit 32 typically includes an injection nozzle 34 which is configured to protrude via the charging aperture 26 of a float 20 to charge air into the float reservoir 22 when said float 20 is at a nadir. In one embodiment, the charging aperture 26 of a float 20 may also include an airlock valve 44 which is configured to allow charging with air when said float 20 is at a nadir and to seal once said float ascends. Such an arrangement of injection nozzle 34 into charging aperture 26 forms a 'moon pool' type interface, as known in the art. In one embodiment, the injection conduit 32 is configured to define a decreasing diameter from the pump 30 to the injection nozzle 34. Such a decreasing diameter on conduit 32 may be used to exploit fluid pressure and velocity principles, e.g. Bernoulli principle.

It is believed that the inclusion of the airlock valves 44 at the base of the floats 20, which can be either physically pushed open by the injection nozzles 34 as a float 20 descends and spring-loaded to close at commencement of ascent, or electronically controlled, may be useful in maintaining air pressure during ascent of the float 20 in order to facilitate energy transfer due to the decreasing hydrostatic pressure increasing the air pressure within the float 20 as it ascends.

Importantly, the injection conduit 32 generally includes a check valve 36 arranged proximate the injection nozzle 34. Such a check valve 36 is configured to maintain air pressure from the injection nozzle 34 into the reservoir 22 of the float 20 and to prevent water flooding the injection conduit 32 when the float 20 ascends within the cylinder 16. The injection conduit 32 may also include air release valve 36.1, which may form part of check valve 36. In one embodiment, the engine's electronic controller may also control the airlock valves 44 and/or check valves 36 and/or air release valves 36.1 in order to regulate charging of floats 20.

In an embodiment, the pump 30 may also include, or be configured to provide, forced induction as required, such as to prime the engine 10 to start operation, to maintain or control specific operating levels, and/or the like. Such forced induction may be powered from the flywheel 42 and/or from an external power source. For example, to facilitate the engine 10 in achieving operating speeds, such forced induction may be activated, or the like. Alternatively, or additionally, other means of priming and/or regulating operating speeds may be used, such as actuators, e.g. electric motor, on force multiplier assembly 38, on the flywheel 42, on power take-off 40, etc. Variations hereon are, of course, possible and expected.

The force multiplier assembly 38 of each reciprocating arrangement 14 is also typically supported on the frame 12 and configured to apply mechanical advantage between the float 20 and the pump 30, as described. In one embodiment, the force multiplier assembly 38 comprises a block and tackle system for applying a mechanical advantage between the float 20 and pump 30. Such a block and tackle system is typically configured at a 3:1 mechanical advantage, but of course variations hereon are possible. The force multiplier assembly 38 is generally configured to apply mechanical advantage when the float 20 ascends and descends, i.e. a suitable cable and pulley system is in place at both ends of the float 20 within the cylinder 16, so that either upward or downward movement of the float 20 receives such a mechanical advantage.

The power take-off 40 of each reciprocating arrangement 14 is generally linked to the respective float 20 and configured to transfer energy from the float 20 as the float 20 ascends within the cylinder 16 via buoyancy differences. In one embodiment, the power take-off 40 is regulated to provide a constant torque and/or velocity. For example, the power take-off 40 may be regulated by means of variable speed gearing, or the like.

In one embodiment, the power take-off 40 may comprise a second force multiplier assembly, i.e. cable and pulley system, linked to a drive wheel which is configured to actuate the flywheel 42 via variable speed gearing. The engine's electronic controller may also be configured to control the variable speed gearing to achieve a desired constant torque and/or velocity to the flywheel 42. Such an arrangement may be useful for synchronous generation, or the like, in an embodiment where the engine includes a synchronous generator coupled to the flywheel 42 to generate electrical energy.

Importantly, each pair of reciprocating arrangements 14.1 and 14.2 are opposedly arranged with their respective floats 20 linked in a reciprocating manner so that as a float 20 of one reciprocating arrangement 14 ascends, the other float 20 of the other reciprocating arrangement 14 of the same pair descends. In one embodiment, each pair of reciprocating arrangements 14 are opposedly arranged with their floats 20 linked in a reciprocating manner by means of a cable and pulley arrangement, or the like.

Additionally, each air injection assembly 28 is arranged to inject air into the float 20, via the charging aperture 26, of an adjacent reciprocating arrangement 14 of the other pair, as described above, i.e. each air injection assembly 28 of a reciprocating arrangement 14 is arranged to inject air into the float 20 of an adjacent non-paired reciprocating arrangement 14. In this manner, the ascent and descent of respective floats 20 can be synchronised to drive such a rotational and sequential flow of air into the floats 20 to facilitate continuous actuation of the flywheel 42 as the engine 10 operates.

As will be appreciated by the skilled addressee, practical engine setup adjustments are generally made by fine-tuning the various drive wheel diameters, pulley and gear ratios. In general, during float ascent, acceleration forces are transferred to the flywheel 42. As the flywheel 42 gains inertia, the load on the reciprocating g arrangements 14 decreases. The universal gearing system can maintain a load on the reciprocating arrangements 14 as the flywheel's momentum increases. Upon reaching a nominal operating speed, frequency control can be maintained by the engine's electronic controller configured via a suitable software program to monitor changes in load and adjust the volume of air entering the reciprocating arrangements 14. Changing air volume changes engine power output.

To increase power, the opening of an air release valve 36.1 (which may be unitary or separate from check valve 36) is limited thereby allowing more air to enter each float 20 and increase buoyancy. Conversely, to decrease power output, the opening of air release valve 36.1 is relaxed thereby venting the air allowing less air to enter each float 20. Alternatively, or additionally, such power control may be facilitated via dynamic control of the respective exhaust valves 24 in order to control buoyancy of the floats 20, i.e. dynamic monitoring and control of valves 36.1 and 24 as per engine operating requirements. Similarly, dynamic control of the universal gearing system maintains constant flywheel RPM through these changes in power.

Further engine efficiency refinements may be possible. For example, in an embodiment, each reciprocating arrangement 14 may include an exhaust hood (not shown) configured to capture air vented from the float 20. Such an exhaust hood may direct the captured air to a turbine, or the like, in a desire to further improve engine efficacy.

Applicant believes it particularly advantageous that the present invention provides for a buoyancy engine 10 which is configured to make use of buoyancy differences between fluids, such as air and water, in order to extract a useful output, typically electrical generation, and/or provide energy conversion.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth. In the example embodiments, well-known processes, well-known device structures, and well-known technologies are not described in detail, as such will be readily understood by the skilled addressee.

The use of the terms "a", "an", "said", "the", and/or similar referents in the context of describing various embodiments (especially in the context of the claimed subject matter) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. As used herein, the term "and/or" includes any and all combinations of one or more of the associated listed items.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It is to be appreciated that reference to "one example" or "an example" of the invention, or similar exemplary language (e.g., "such as") herein, is not made in an exclusive sense. Accordingly, one example may exemplify certain aspects of the invention, whilst other aspects are exemplified in a different example. Variations (e.g. modifications and/or enhancements) of one or more embodiments described herein might become apparent to those of ordinary skill in the art upon reading this application. The inventor(s) expects skilled artisans to employ such variations as appropriate, and the inventor(s) intends for the claimed subject matter to be practiced other than as specifically described herein.

The invention claimed is:

1. A buoyancy engine comprising:

a support frame;

at least two pairs of reciprocating arrangements supported on said support frame, each reciprocating arrangement of the at least two pairs of reciprocating arrangements comprising:

i) a fluid cylinder operatively filled with a fluid;

ii) a float arranged within the fluid cylinder and defining a reservoir with an exhaust valve located at an upper portion and a charging aperture at a lower portion via which said float is chargeable with atmospheric air;

iii) an air injection assembly comprising a pump and an injection conduit, the pump linked to the float so that said pump draws the atmospheric air when the float descends and charges said drawn atmospheric air via the injection conduit when the float ascends;

iv) a force multiplier assembly supported on the frame and configured to apply mechanical advantage between the float and the pump; and v) a power take-off linked to the float and configured to transfer energy from the float as said float ascends within the cylinder;

a flywheel arranged on the support frame and coupled to each of the respective power-take offs;

wherein each pair of the at least two pairs of reciprocating arrangements are opposedly arranged with the floats of each pair of the at least two pairs of reciprocating arrangements linked in a reciprocating manner; and wherein each air injection assembly of each pair of the at least two pairs of reciprocating arrangements is arranged to inject the air into the float of an adjacent reciprocating arrangement of another pair of the at least two pairs of reciprocating arrangements via the charging aperture of the adjacent reciprocating arrangement, to facilitate continuous actuation of the flywheel as the engine operates.

2. The buoyancy engine of claim 1, wherein the support frame is substantially rectangular with a reciprocating arrangement of the at least two pairs of reciprocating arrangements arranged on each corner of the support frame.

3. The buoyancy engine of claim 1, wherein each pair of the at least two pairs of reciprocating arrangements are opposedly arranged with the floats of each pair of the at least two pairs of reciprocating arrangements linked in the reciprocating manner by a cable and pulley arrangement so that as a float of one reciprocating arrangement of each pair of the at least two pairs of reciprocating arrangements ascends, the other float of the other reciprocating arrangement of said each pair of the at least two pairs of reciprocating arrangements descends.

4. The buoyancy engine of claim 1, wherein each air injection assembly of the reciprocating arrangements is arranged to inject the air into the float of an adjacent non-paired reciprocating arrangement.

5. The buoyancy engine of claim 1, wherein the exhaust valve of a respective float of the floats is configured to vent the air automatically from the respective float when said respective float is at a climax.

6. The buoyancy engine of claim 1, further comprising an electronic controller configured to control the exhaust valves in order to regulate buoyancy of the floats.

7. The buoyancy engine of claim 1, wherein each of the air injection assemblies is configured to charge an adjacent float of the floats with the air when said adjacent float is at a nadir.

8. The buoyancy engine of claim 1, wherein the pump of each of the air injection assemblies comprises a bellows.

9. The buoyancy engine of claim 1, wherein the injection conduit of each of the air injection assemblies includes an injection nozzle configured to protrude via the charging aperture of the respective float to charge the air into the respective reservoir of the respective float when said respective float is at a nadir.

10. The buoyancy engine of claim 9, wherein the injection conduit of each of the air injection assemblies is configured to define a decreasing diameter from the respective pump to the respective injection nozzle.

11. The buoyancy engine of claim 9, wherein the injection conduit of each of the air injection assemblies includes a controllable check valve proximate the respective injection nozzle.

12. The buoyancy engine of claim 11, further comprising an electronic controller configured to control the controllable check valves in order to regulate charging of the floats.

13. The buoyancy engine of claim 1, wherein each of the force multiplier assemblies comprises a block and tackle system for applying a mechanical advantage between the respective float and the respective pump.

14. The buoyancy engine of claim 1, wherein each of the force multiplier assemblies is configured to apply mechanical advantage when the respective float ascends and descends.

15. The buoyancy engine of claim 1, wherein each of the power take-offs is regulated to provide a constant torque and/or velocity.

16. The buoyancy engine of claim 15, wherein the power take-offs are regulated by a variable speed gearing.

17. The buoyancy engine of claim 16, wherein each of the power take-offs comprises a second force multiplier assembly linked to a drive wheel configured to actuate the flywheel via the variable speed gearing.

18. The buoyancy engine of claim 16, further comprising an electronic controller configured to control the variable speed gearing to achieve a desired constant torque and/or a desired velocity to the flywheel.

19. The buoyancy engine of claim 1, wherein each of the reciprocating arrangements includes an exhaust hood configured to capture the air vented from the respective float, and the exhaust hood is configured to direct the captured air to a turbine.

20. The buoyancy engine of claim 1, wherein the charging aperture of each of the floats includes an airlock valve configured to allow charging with the air when said respective float is at a nadir and to seal once said respective float ascends.

* * * * *